March 23, 1937. L. R. HOOPER 2,074,609

SUSPENSION MEANS FOR ROAD VEHICLES

Filed Nov. 20, 1935

Witness: Arthur Thompson

Inventor: Leslie Richard Hooper

Patented Mar. 23, 1937

2,074,609

UNITED STATES PATENT OFFICE 2,074,609

SUSPENSION MEANS FOR ROAD VEHICLES

Leslie Richard Hooper, Johannesburg, Transvaal, Union of South Africa

Application November 20, 1935, Serial No. 50,734

4 Claims. (Cl. 280—124)

This invention has reference to suspension means applicable to motor vehicles, and other mechanically propelled road vehicles. It is adapted for use with any type of motor vehicle and particularly with heavy vehicles of the truck, lorry and bus type.

The object of the invention is to design means whereby torsional stresses in the chassis or undercarriage and body or superstructure will be minimized if not entirely eliminated.

The arrangement according to the invention is characterized by means interposed between the chassis or underframe and each of two or more of the wheels and actuated by the relative vertical movement of the wheels to each other or to the chassis or underframe, which means are combined either with the ordinary vehicle spring or springs, or other cushioning means and co-operate automatically to equalize or tend to equalize the load on the wheels, and also the shock transmitted to the chassis or underframe and body or superstructure when the wheels encounter obstructions, or inequalities in the road surface. By this arrangement the distortion of the chassis or underframe and superstructure is largely obviated or minimized.

The arrangement in one embodiment of the invention for application to two or more of the vehicle wheels, is in the form of intercommunicating liquid-containing cylinders and co-operating pistons, rams or plungers, each cylinder and its piston being connected the one to the body, chassis or underframe, say through the medium of the ordinary main transverse spring, and the other to the part by which the road wheel is carried.

In another embodiment the ordinary main spring could, if desired, be dispensed with, and each cylinder or piston be connected to a rigid portion of the body, chassis or underframe. In this construction the cylinders would be placed in communication with one or a plurality of equilibrium tubes or cushioning devices, each including a piston or plunger, or pistons or plungers operated by the liquid pressure in the cylinders and working against springs or equivalent resilient means.

In an alternative construction the load equalizing arrangement could be automatically mechanically controlled and include a cushioning device and co-operating arrangements of levers and links acting between the chassis or underframe and wheels.

The invention will be more fully explained with the aid of the accompanying drawing, wherein Fig. 1 is a part-sectional elevation of one embodiment of the invention.

Figures 1, 2:
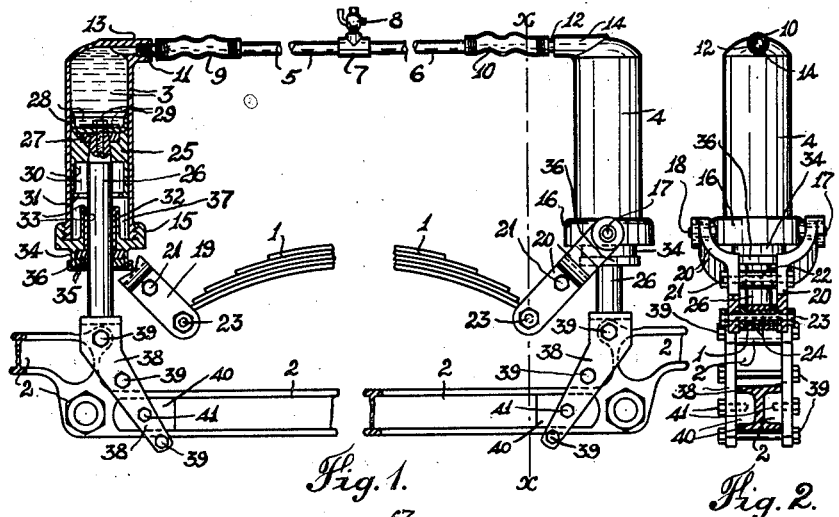
Fig. 2 is a sectional end elevation of Fig. 1 on line $x$—$x$.

In the embodiment shown in Figs. 1 and 2, I illustrate the adaptation of the invention to a vehicle in which the suspension means includes a transverse main front spring 1, and in which a front axle 2 is employed. In this arrangement two cylinders 3, 4, are provided and are placed in communication at their upper ends through the medium of the tubes 5, 6, which are connected by means of a T-piece 7 to which is attached a valve 8. The pipes 5, 6, are connected at their other ends through the medium of flexible tubes 9, 10, and nipples 11, 12, to tubular branches 13, 14, formed on the cylinders 3, 4.

The lower ends of the cylinders 3, 4, are closed by means of caps or covers 15, 16, on which are formed diametrically opposed projections or trunnions 17, 18. The cylinders 3, 4, are connected to the extremities of the main spring 1, through the medium of the trunnions 17, 18, by means of bifurcated links 19, 20. The links 19, 20, each consist of two parts which at their one end each embrace one of the trunnions 17, 18. The parts are connected together by means of a bolt 21 and distance piece 22, and at their other ends are attached by bolts 23 and bushes 24 to the respective ends of the spring 1.

In each of the cylinders 3, 4, is arranged a piston or plunger 25, which is fixed upon the end of a piston rod 26, by means of a nut 27 seated in a recess in the piston 25. On the upper end of the piston 25 is fixed a cup leather or the like 28 by means of a screw and washer 29. The piston 25 is constructed with a hollow cylindrical extension 30 provided with an internal flange 31. The cylinder caps or covers 15, 16, are each constructed with an internal tubular projection or boss 32, in which is arranged a bush 33 through which the piston rod 26 works. The caps or covers 15, 16, are each also constructed with an external tubular projection or boss 34 in which is arranged felt or similar packing and lubricating washers 35, which are retained in position by means of a cap 36. On the downward movement of either of the pistons 25 the internal flange 31 enters the recess 37 between the wall of the cylinder 3 or 4 and the hollow projection or boss 32, and acts with a dash-pot effect on the air or any liquid placed in the lower portion of the cylinder to retard the relative movement between the piston 25 and cylinder as the piston approaches the bottom of the cylinder.

The outer and lower ends of the piston rods 26 are each fashioned with a bifurcated extension 38, the parts of which project to opposite sides of the axle 2 and are rigidly connected thereto by means of bolts 39. 40 are filling pieces arranged in the recesses in the sides of the axle 2 and retained in position by screws 41 screwed through the parts of the bifurcated extension 38 into said filling pieces 40.

In the normal position of the vehicle the pistons 25 are at the same height or level in their respective cylinders 3, 4, and the axle 2 and chassis are horizontal. The cylinders 3, 4, above the pistons 25—see Fig. 1—and the pipes and connections 5, 6, 7, 9, 10, 11, which place them in communication, are filled with a suitable liquid, such as thin oil. The filling of the cylinders and pipes may be effected through the medium of the valve 8.

Figure 3:
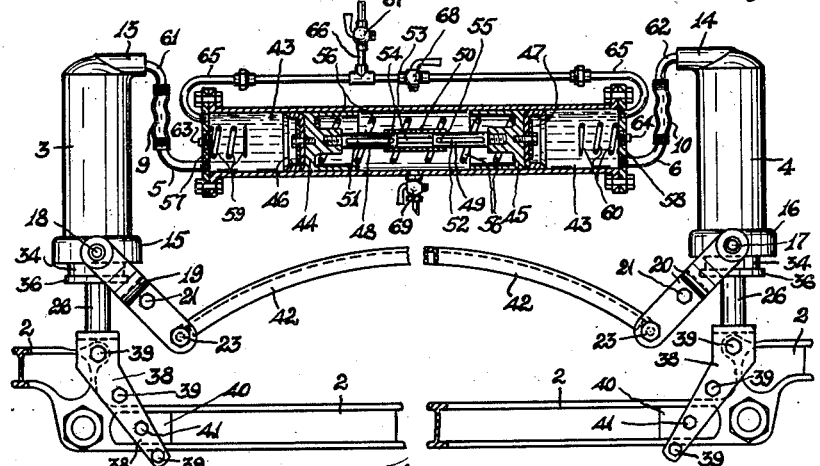
Fig. 3 is a part-sectional elevation of another embodiment of the invention.
Figure 4:
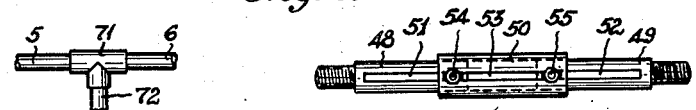
Fig. 4 is an elevation of portion of the arrangement shown in Fig. 3.

In the arrangement illustrated in Figs. 3 and 4, the ordinary transverse main spring is dispensed with, and each cylinder 3, 4, is connected, through the medium of the links 19, 20, to one end of a rigid member 42 of the chassis. In this construction 43 represents an equilibrium tube or cylinder of a cushioning device, in which are operatively arranged two pistons or plungers 44, 45, fitted at their outer ends with cup-leathers 46, 47. The pistons or plungers 44, 45, are attached by a telescopic connection which comprises—see also Fig. 4—the rods 48, 49, screwed into the pistons 44, 45, respectively, and slidably connected by means of a sleeve 50. The rods 48, 49, are constructed with longitudinal slots 51, 52, and the sleeve is provided with a similar slot 53; 54, 55, being bolts which engage in the slot 53 and in the slots 51, 52, in the rods 48, 49, respectively. This allows the pistons 44, 45, to move in the direction of each other, and serves also as a stop for limiting their movement in the other direction. Between the pistons 44, 45, and around the rods 48, 49, and sleeve 50 is arranged a helical compression spring 56. This spring 56 operates yieldingly to keep the pistons 44, 45, at the maximum distance apart. The ends of the cylinder 43 are closed by covers 57, 58, to the inside of which are attached buffer springs 59, 60, for the pistons 44, 45. From this construction it follows that the liquid pressure on the end of one piston 44 or 45 will force the pistons 44, 45, and intervening spring arrangement, as a whole, longitudinally of the cylinder 43. This will displace the liquid in front of the other piston into the adjacent cylinder 3 or 4, to equalize the liquid pressure in both cylinders 3, 4, and the load on the wheels. In the event of the impact of both wheels simultaneously the pistons 44, 45, will be caused to approach each other and compress the intervening spring 56, and thereby cushion the resultant shock.

The opposite ends of the cylinder 43 are placed in communication with the cylinders 3, 4, by means of the pipes 5, 6, flexible tubes 9, 10, and bends 61, 62. Plugs 63, 64, screwed into holes in the covers 57, 58, enable the pistons 44, 45, and their telescopic connection to be placed in a substantially medial or central position in the cylinder 43. The ends of the cylinder 43 are adapted to be placed in communication by means of a further tube 65, in which is provided a branch pipe 66, fitted with a filling valve 67; 68 being a further valve for closing the tube 65 to the ends of the cylinder 43. A drain cock 69 is provided in the bottom of the cylinder 43 for drawing off any liquid that may find its way into the space between the pistons 44, 45.

In this arrangement the piston rods 26 are connected to the axle 2 by means of the bifurcated extensions 38, as in Figs. 1 and 2. Other parts of this arrangement are denoted by the same reference numerals as in Figs. 1 and 2.

Figures 5, 6:
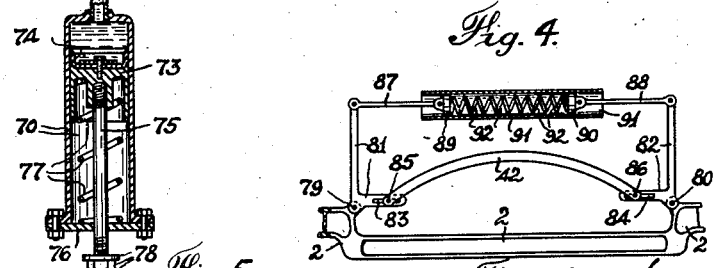
Fig. 5 is a sectional elevation of a modified form of portion of the arrangement shown in Fig. 3
Fig. 6 is a part-sectional elevation of a further embodiment of the invention.

In Fig. 5, I illustrate a modified form of the cushioning device described in connection with Fig. 3. In this modification a cylinder 70 is placed in communication with the pipes 5 and 6 through a T-piece 71 and nipple 72. In the cylinder 70 a single piston 73 is operatively arranged. The piston 73 is fitted with a cup-leather 74 and attached to a rod or stem 75. Between the cover 76 of the cylinder 70 and the piston 73 a helical compression spring 77 is arranged. The rod or stem 75 works through a hole in the cover 76 and the outer end thereof is provided with a washer, nut and check-nut 78, to function as a stop in one direction for the piston 73. One or a plurality of the cushioning devices shown in Fig. 5 can be interposed at convenient points in the tubular connection between the cylinders 3 and 4.

In Fig. 6, in which a further embodiment of the invention is depicted, the axle 2 has pivoted to it at 79, 80, two bell-crank or angle levers 81, 82. The bell-crank levers 81, 82, are slidably attached to the rigid member 42 of the chassis by providing them with slots 83, 84, which engage bolts or pins 85, 86, fixed to the ends of the member 42. To the ends of the other arms of the levers 81, 82, are pivotally attached rods 87, 88, which are pivotally attached at their other ends to pistons 89, 90, operatively arranged in the cylinder or tube 91 of the cushioning device; 92 being the cushioning spring arranged in the cylinder or tube 91 between and engaging the pistons 89, 90.

The manner in which the arrangement illustrated in Figs. 1 and 2 functions to obviate the transmission of torsional stresses to the chassis and body of the vehicle may be described as follows: The system, that is the cylinders 3 and 4 above the pistons 25, and the tubular connections which place them in communication, is filled with the suitable liquid. Any up or down movement of either of the wheels, which are connected to the axle 2, relative to the other results in the axle 2 being inclined and the pistons 25 and cylinders 3, 4, acting by displacement of the liquid to equalize the load on the wheels, and so prevent distortion of the chassis or body. In this arrangement the load-equalizing means is combined with the ordinary main front transverse spring 1.

In the form of the invention shown in Fig. 3, the cushioning device comprising the telescopic resilient connection between the pistons 44, 45, performs the same function as the main spring and allows the equalizing of the load to be effected by the cylinders 3, 4, and pistons 25, through the medium of the liquid. The tube 65 placing the ends of the cylinder 43 in communication by means of the valve 68, allows the pistons 44, 45, of the cushioning device to be placed in a central or medial position in the cylinder 43.

In the cushioning device illustrated in Fig. 5, the liquid which is displaced from the cylinders 3, 4, is free to enter the cylinder 70 and to act on the piston 73 and cushioning spring 77 to absorb shock.

In the modified construction illustrated in Fig. 6, the wheel movements are transmitted through the bell-crank levers 81, 82, to the resilient cushioning device in the cylinder or tube 91.

The load-equalizing arrangement has the advantage that, when a vehicle equipped therewith is negotiating a bend at speed, and the centrifugal force tends to throw the body of the vehicle to the outside of a curve, the load on the front wheels of the vehicle remains equal, with the result that the vehicle keeps the road better and increased steering stability is afforded.

In all the embodiments of the invention illustrated in the drawing the front axle 2 is retained. It would, however, be possible to dispense with the front axle, in which case the cylinders 3, 4, of the equalizing arrangement could be built into the chassis frame.

In the accompanying drawing and foregoing description I indicate the application of the invention to the front wheels of a vehicle, but it may be preferred to apply the same to the rear wheels, or both wheels at the same side, or the front and back wheels diagonally of the vehicle, or all the four wheels may be interconnected. As a case in point the last-mentioned application would be particularly suitable to ambulances and like vehicles, as such arrangement would give greater comfort by damping out even comparatively small shocks.

What I claim as my invention and desire to protect by Letters Patent is:—

1. A suspension means for road vehicles, including for each of a plurality of the wheels of the vehicle a liquid-containing cylinder and a co-operating piston, a flexible tubular connection placing said cylinders in communication, and cushioning means interposed in the tubular connection between the cylinders, each cylinder and its piston being connected the one to the underframe of the vehicle and the other to the part by which its wheel is carried, said cushioning means including a cylinder, two pistons arranged in said cylinder, a telescopic connection between the pistons, and a spring between the pistons, as set forth.

2. A suspension means for road vehicles, including for each of a plurality of the wheels of the vehicle a liquid-containing cylinder and a co-operating piston, a flexible tubular connection placing said cylinders in communication, and cushioning means interposed in the tubular connection between the cylinders, each cylinder and its piston being connected the one to the underframe of the vehicle and the other to the part by which its wheel is carried, said cushioning means including a cylinder, two pistons arranged in said cylinder, a cup-leather fitted to the outer end of each of the pistons, a telescopic connection between the pistons, a spring between and engaging the inner ends of the pistons, buffer springs adapted to be engaged by the outer ends of the pistons, and a drain cock for drawing off liquid from the cushioning cylinder between the pistons, as set forth.

3. A suspension means for road vehicles, including for each of a plurality of the wheels of the vehicle a liquid-containing cylinder and a co-operating piston, a flexible tubular connection placing said cylinders in communication, and cushioning means interposed in the tubular connection between said cylinders, each cylinder and its piston being connected the one to the underframe of the vehicle and the other to the part by which the wheel is carried, said cushioning means including a cylinder, two piston arranged in said cylinder, a telescopic connection between the pistons, a spring between the pistons, a pipe placing the ends of the cylinder in communication, a valve for controlling the flow of liquid in said pipe, and a filler cock for admitting liquid to the cylinders through said pipe, as set forth.

4. A suspension means for road vehicles, including for each of a plurality of the wheels of the vehicle a liquid-containing cylinder and a co-operating piston, a flexible tubular connection placing said cylinders in communication, and cushioning means interposed in the tubular connection between the cylinders, each cylinder and its piston being connected the one to the underframe of the vehicle and the other to the part by which its wheel is carried, said cushioning means including a cylinder having a cylinder cover, a piston in said cylinder, and a cushioning spring in said cylinder between the cylinder cover and the piston, as set forth.

LESLIE RICHARD HOOPER.